United States Patent [19]

Penley

[11] 4,289,080

[45] Sep. 15, 1981

[54] HIGH-SPEED TRANSPLANTER

[75] Inventor: Percy A. Penley, Basking Ridge, N.J.

[73] Assignee: Celanese Corporation, New York, N.Y.

[21] Appl. No.: 60,308

[22] Filed: Jul. 25, 1979

[51] Int. Cl.³ .......................................... A01C 11/02
[52] U.S. Cl. .......................................... 111/3; 111/76; 198/470; 198/857
[58] Field of Search ................ 111/2, 76, 3; 198/470, 198/857

[56] References Cited

U.S. PATENT DOCUMENTS

| | | | |
|---|---|---|---|
| 1,350,774 | 8/1920 | Braley et al. | 198/857 |
| 1,398,190 | 11/1921 | Howard | 111/3 |
| 1,549,399 | 8/1925 | Williams | 198/470 |
| 1,907,142 | 5/1933 | Bradley et al. | 198/857 |
| 2,649,951 | 8/1953 | Sandberg | 198/470 |
| 2,959,141 | 11/1960 | Wilson | 111/2 |
| 3,002,473 | 10/1961 | Morine | 111/2 |
| 3,160,259 | 12/1964 | Dalton | 198/470 X |
| 3,524,419 | 8/1970 | Middleton et al. | 111/2 |
| 3,554,351 | 1/1971 | Rothenbach et al. | 198/857 X |
| 3,712,252 | 1/1973 | Huang | 111/2 |
| 3,850,289 | 11/1974 | Behr et al. | 198/857 X |
| 3,872,805 | 3/1975 | Kolk et al. | 111/2 |
| 4,130,072 | 12/1978 | Dedolph | 111/2 |
| 4,132,337 | 1/1979 | Masuda et al. | 111/2 |
| 4,145,981 | 3/1979 | Jimenez | 111/76 |
| 4,156,395 | 5/1979 | Edwards et al. | 111/3 |

FOREIGN PATENT DOCUMENTS

| | | | |
|---|---|---|---|
| 634508 | 1/1962 | Canada . | |
| 849197 | 9/1952 | Fed. Rep. of Germany | 111/3 |
| 928130 | 5/1955 | Fed. Rep. of Germany | 111/3 |
| 2330600 | 5/1974 | Fed. Rep. of Germany | 111/2 |
| 34402 | 6/1929 | France | 111/3 |
| 680740 | 5/1930 | France | 111/3 |
| 2383595 | 11/1978 | France | 111/3 |
| 22915 | 3/1962 | German Democratic Rep. | 111/3 |
| 324865 | 2/1930 | United Kingdom . | |
| 337412 | 10/1930 | United Kingdom | 111/3 |
| 1214058 | 12/1970 | United Kingdom . | |
| 1219366 | 1/1971 | United Kingdom | 111/2 |
| 521861 | 7/1976 | U.S.S.R. | 111/2 |

Primary Examiner—Steven A. Bratlie
Attorney, Agent, or Firm—Herbert P. Price; K. A. Genoni; T. J. Morgan

[57] ABSTRACT

A high-speed transplanter is described for mechanical transplanting of seedlings in grow blocks formed into easily handled modules. The transplanter includes cutting blades for separating the modules into files, delivery tubes for downwardly moving the files into spaced-apart positions above furrows, wheels for pulling off individual blocks and placing them at zero ground speed within the furrows, and an assembly for detecting dud blocks (having no seedling) and advancing a file by an extra block length to provide a seedling block for the wheels. This system depends on the probability that finding two non-germinated seeds in consecutively linear sequence is much lower than the percentage of non-germinated seeds within a pattern of randomly distributed seeds.

27 Claims, 25 Drawing Figures

HIGH-SPEED TRANSPLANTER

BACKGROUND OF THE INVENTION

1. Field of the Invention

This invention relates to a method and apparatus for transplanting seedlings, grown in molded pulp planting blocks conjoined in tray-like groups, into a plurality of furrows where they are individually and selectively spaced. It particularly relates to a method and apparatus for high-speed transplanting of such seedlings with a minimum of hand labor and further relates to a method and apparatus for minimizing gaps caused by non-germinated seeds.

2. Review of the Prior Art

A plant setting machine which is drawn by a tractor is described in U.S. Pat. No. 2,959,141. Operators stand or sit at each side of the machine, select plants from supply hoppers, and place them on a plant tray structure in the operating path of planting arms.

A pineapple planting machine which includes a frame that is adapted to be mounted on a conventional tractor and a planter which is arranged rearwardly of the tractor for automatically inserting and positioning a plurality of pineapple shoots or plants in the ground at the proper locations is described in U.S. Pat. No. 3,002,473. Workmen standing on a platform take pineapple shoots from a feed basket or hopper and place them butt end down into the plant trough between planting blade assemblies. The plants are crowded through and to the end of the trough by a metal plate and are injected by rollers into an opening prepared by a vibrated roller.

A planting apparatus comprising a storage conveyor which delivers plants in plastic bags to one end, an unbagging conveyor which advances each plant over a pair of stripping belts for stripping the plastic bags from the generally cylindrical plug of earth enclosing the plants, and a pusher-like plant dispensing member which dispenses each plant from a holding station into a furrow is described in U.S. Pat. No. 3,524,419.

A plant transplanting apparatus which is designed for transplanting seedlings which have been grown in a tray made of a thin plastic sheet or metal foil is described in U.S. Pat. No. 3,712,252. This automatic transplanter is adapted to support and index a plurality, such as four, of seedling growing-and-handling devices and includes four indexing openings and drop pipes or tubes which are connected to a source of reduced pressure whereby suction assists in discharging the seedlings in their respective growth zones when placed over an index opening and bearing plate.

A planting machine that is capable of transplanting potted plants and is incorporated in a trailer vehicle having a plurality of receptacle sub-assemblies which are disposed at an even angular spacing around the axis of a shaft is described in U.S. Pat. No. 3,872,805. Potted plants which are arrayed on trays on this planting machine are manually removed by a seated operator and are successively placed in receptacle sub-assemblies by a power-transfer system between the wheels and the shaft so that the velocity of the lowermost receptacle sub-assembly is substantially zero with respect to the ground as the contents of the receptacle are placed in an opening therein.

A transplanting machine, combining a hotbed feed frame and a motor supporting frame upon forward traction wheels, is described in British Pat. No. 324,865. Adjacent to the hotbed frame is a trough which is provided with the upper portion of an endless belt movably mounted therewithin, whereby hotbeds, caked into angular molds, are longitudinally arranged and placed close to one another on the frame while being supported in parallel upon two or more laterally travelling belts which move the group of hotbeds towards the trough while one mold is being moistened with water. The cake hotbed is then separated from its mold by contact with a sharp edge and a wedge and laid into a suitable furrow made by a plow.

A combine machine which provides means for establishing a seedling plant nursery upon its frame in order to produce a supply of seedlings and permit them to grow unhindered for transferring to their permanent position in the cultivated soil is described in British Pat. No. 1,214,058, the seedlings moving gradually from the position where the seed is sown to the position from which they can be readily planted. Trays in the form of long troughs are supported at a slope in compost which is divided into individual portions containing a single grown seedling, the trays being linked together to be movable as a whole to a limited extent transversely of the machine by a belt in each tray. Successive belt movements cause the compost to be cut into sections by the blades of a cutting device.

A planting machine for planting cartridges containing grown plant seedlings in a furrow formed by a furrower and for covering the cartridges with a soil closing implement is described in Canadian Pat. No. 634,508. The seedling cartridges are placed on trays or magazines and are shifted to planting chutes which tilt down until they abut against the bottom of a furrow, whereby the seedling cartridges slip down and are erected to a substantially vertical position while soil is closed around them.

Productivity has generally been limited by two factors when attempts have been made to mechanize the transplanting operation. Most machines function by opening the soil to form a furrow, grasping the individual plants, releasing them in position in a furrow, and firming the soil around the plants. The grasping mechanism is usually fed by hand, using one or two operators per row planted, so that the speed is limited by operator dexterity as the first factor. The second factor is the necessity to handle the seedlings by their stems, thus often requiring a longer growth period in the greenhouse than is optimum for the species being transplanted. A compromise is consequently made between stem durability and transplant shock, and die-offs caused by damaged stems tend to limit productivity. Furthermore, mechanical transplanting at the present time tends to involve a small army of laborers who move at a very slow pace in the field.

There is consequently a need for greatly improving the speed of mechanical transplanting, its efficiency as measured by percentage survivals, its efficiency as measured by machine time per traverse of the transplanting machine. Furthermore, there is need for utilizing the latest developments in the art of growing seedlings so that the seedlings can be manipulated, spaced apart, placed in a furrow, and covered with firmed soil without touching the stems or putting any pressure upon the plants themselves. There is still further a need to incorporate modern methods for growing seedlings in molded grow blocks and then for culling, rejecting, or replacing each grow block that lacks a seedling, whereby planting efficiency can be increased by producing a more perfect stand.

SUMMARY OF THE INVENTION

It is accordingly an object of this invention to provide a mechanical transplanter that is capable of moving at much higher speeds, such as about three miles per hour, than is now possible.

It is another object to provide a mechanical transplanter which is capable of planting at least eight rows simultaneously.

It is further an object to provide an apparatus and a method for using it that increases productivity by planting several times as many acres per day as is presently done.

It is also an object to provide an apparatus and a method for handling seedlings without touching the stems in any manner, whereby seedlings can be transplanted at their optimum age.

It is additionally an object to provide a transplanting apparatus and method that permits high production with few operators.

In accordance with these objectives and the principles of this invention, a mechanical transplanter is herein described which maintains seedlings in easily handled modules (cakes) until immediately before transplanting, then separates them into individual blocks, next places the individual blocks precisely in the furrow, and finally covers the root zones with soil, all without handling the seedlings by the stems. Furthermore, the transplanter of this invention comprises two alternative systems that compensate for the seedlings which have failed to grow.

The simpler system involves separation of cakes into individual blocks at a cutting station in front of each operator, whereby the operator is able to make an individual inspection and culling of dud blocks so that only blocks containing seedlings arrive at the furrows. It is herein described and identified as the separated-block embodiment. The other system depends upon rules of probability, for statistically minimizing the planting of a block without a seedling, and operates by detecting the absence of a plant and setting off at least two adjacent end blocks at one location. This system depends on the probability that finding two non-germinated seeds in consecutively linear sequence is much lower than the percentage of non-germinated seeds within a pattern of randomly distributed seeds. It is designated as the separated-file embodiment.

In summary, the high-speed transplanter of this invention for transplanting seedlings, grown in blocks which are conjoined into multi-unit cakes, comprises, for the separated-file embodiment:

A. a frame which is rotatively supported on wheels and is adapted to be towed by a vehicle, such as a tractor, over a tilled field;

B. a tray storage assembly which is mounted on the frame;

C. an operator station which is disposed alongside the tray storage assembly and generally comprises a seat;

D. a tray table upon which the trays are sequentially placed after removal from the tray storage assembly;

E. a cutting station upon which cakes from the trays are sequentially placed;

F. a cutting means for separating the sequentially placed cakes into a plurality of files of conjoined blocks, comprising a gang saw or gang blade assembly;

G. a delivery assembly which includes a plurality of delivery tubes, each having a separation station at its rearward end which is disposed above a furrow in the soil, the plurality of longitudinally aligned files being fed end-to-end into the front end of each delivery tube and being delivered rearwardly and downwardly to the separation station where the leading block of the rearwardmost file is retained;

H. a seedling sensing means for sequentially detecting the presence of a seedling in each block of the plurality of files;

I. a signalling means, which is connected to said seedling sensing means, for indicating a dud block in which the presence of a seedling is not detected;

J. a block advancement means for advancing any file, in which a dud block has been indicated by the signalling means, through a distance equalling the length of one block, whereby the next block following the dud block is at the separation station; and K. a block placement means for moving the block which is at the separation station into upright position within the furrow.

For the separated-block embodiment, the cutting means of paragraph F separates all of the blocks of a cake, so that those lacking a seedling can be individually culled by the operator, and the seedling sensing means of paragraph H, the signalling means of paragraph I, and the block advancement means of paragraph J are entirely omitted.

All embodiments of the high speed transplanter of this invention operate at a transplanting speed of about two acres per hour, when planting seedlings in grow blocks at a spacing of $11\frac{1}{2}$ inches, and use three men plus necessary support personnel for loading trays into transport boxes at the greenhouse, for transporting the boxes to locations in the field for hourly rendezvous with the high-speed transplanter, and for assisting the transplanter personnel with removing empty transport boxes and adding full ones to the tray storage assembly of the transplanter. In general, the number of operating personnel is far lower than the number needed for any machine that is available in the prior art. Because of its handling methods which constantly protect the stems of the seedlings, they can be transplanted at a relatively young age, as compared to the prior art, with little transplant shock, resulting in higher yields of uniform vegetables or crops. Additionally, this transplanter minimizes the number of empty spaces in the field so that its efficiency is outstanding as compared to the prior art.

The separated-file embodiment of this high-speed transplanter achieves such results by:

A. handling the seedlings as conjoined grow blocks, firstly as components of trays, next as components of cakes, and thirdly as components of sticks;

B. delivering the sticks rearwardly and downwardly to positions either within a plurality of furrows or at a short distance thereabove through delivery tubes that curvingly and smoothly diverge and descend while preferably allowing the stems and leaves of the seedlings to protrude through top slots in the delivery tubes;

C. sensing the presence of the seedlings in each grow block that is passing through each delivery tube and thereby detecting the absence of a seedling in a "dud block";

D. signalling the presence of a dud block to a holding-back-and-feeding mechanism;

E. advancing an additional block when such a signal is received;

F. detaching the leading block containing a seedling (i.e., a "seedling block", as contrasted to a dud block) from the succeeding blocks;

G. moving the seedling block to its destined position in the furrow and depositing it there at zero speed in relation to the ground; and H. firming soil about the seedling.

The entire process operates without human contact after a tray is placed in position for cutting into files or sticks. Each operator consequently has ample time to take selected trays out of racks (transport boxes) in storage assemblies on each side of him, to place the trays on a tray table in front of him, to move cakes from the trays to his cutting station, and to push the separated sticks into the entrances of the four delivery tubes in front of him. Moreover, although these activities keep him busy, he yet has time to make periodic visual surveys of the rows of green plants behind the transplanter so that he can quickly notify the tractorman if any malfunctioning has occurred.

This cycle is repeated about two times per second so that each operator is feeding four rows at up to 8.4 plants per second by alternatively handling 48 blocks from each tray. At this rate of operation, about one cake is being fed each six seconds, giving ample time for the operator to change trays about every three or four minutes and to monitor four rows. The two operators and the tractorman are thus able to plant up to two acres per hour, requiring about 152 trays at 76 trays per side. This rate is several times the rate of the prior art at the present time.

The high-speed transplanter is preferably pulled behind a tractor or specialty vehicle fitted with four-wheel drive or tracks and a low-speed transmission. The vehicle could be filled with a sufficient number of transport boxes for reloading of the tray racks when the transplanter is in the remote parts of the field.

As previously described, this invention comprises two basic embodiments involving the cutting means and the culling system for dud blocks: the separated-block embodiment and the separated-file embodiment. Additionally, this invention comprises two basic embodiments involving the block placement means which are identified for reference herein as: (1) a pickup embodiment utilizing a tong wheel, and (2) a push-off embodiment utilizing a pair of side conveyor belts, a pair of separation wheels, and plows, either being readily combined with either the separated-block embodiment or the separated-file embodiment.

Three embodiments which principally involve the signalling means and the block advancement means, with relatively minor variations in the seedling sensing means, are further disclosed for operation with the separated-file embodiment and the pickup embodiment. These three embodiments are identified for reference herein as: (1) the slide embodiment, (2) the piston delivery embodiment, and (3) the bottom conveyor embodiment.

On the frame of this high-speed transplanter are two operator platforms and four hydraulically driven mini-mulchers of the roto-tiller type, each of which mulches two trenches about four inches wide and four inches deep. Shields and plows, which are also attached to the frame, then form the mulched soil into a transplant bed and excavate within it a pair of furrows which are each about one inch deep and two inches wide with contoured sides.

Adjacent to each operator on either side of him are a pair of tray storage assemblies or tray racks and a tray table which is in front of him and disposed transversely across the machine, extending beneath the tray racks and on either side of the cutting station. The trays can be of any desired size and configuration. Preferably, they contain eight cakes side by side, each cake being 10 inches by 3 inches by one inch for lettuce growing, as an example, containing 48 molded blocks in four files or sticks of 12 blocks. Each tray has a small lip at one end. The trays are loaded at a greenhouse into a transport box, such as a fivesided plywood box with stub shelves for holding the edges of a tray. The open sides of the boxes can be faced towards each other for retaining moisture while the box is being transported from the greenhouse to the field. This procedure is known in the art and is used, for example, with the Speedling ® system of Speedling ®, Inc., P.O. Box 7098, Sun City, Fla. 33586.

Using lettuce growing as an example, the grow blocks are about one inch high and the plants are up to an inch in height when less than three weeks old with up to four leaves on each plant. The stub shelves are consequently about two inches apart. The transport box preferably contains 20 shelves which are two trays deep, totaling 40 trays containing 320 cakes. With 48 grow blocks in each cake, there are 30,720 blocks per operator when the transplanter is initially loaded.

A transport box is placed on each side of each operator with its open side facing him to form a tray rack. Each operator can reach about three feet vertically and two feet horizontally into the racks to pull out a tray and place it on the tray table alongside the cutting station. He then removes one of the eight cakes from the tray and places it on the cutting station.

The cutting means preferably comprises a gang of rotating circular blades or saws, equipped with shielding, which slice or saw the cakes apart into files or into individual blocks on the cutting station. The preferred separated-file embodiment of the cutting means, for producing files or sticks of blocks, comprises a trio of blades in parallel for producing four files of blocks in longitudinal alignment with the entrances of the delivery tubes.

The separated-block embodiment of this cutting means, for producing individual blocks, also includes a gang of eleven block-producing blades which are aligned sidewise to the machine and to the trio of file-producing blades. When the four files are pushed sidewise toward and past these eleven blades, they are smoothly separated into 48 blocks, whereby the operator can visually locate and manually discard the dud blocks. This embodiment is not shown in detail in the drawings. Its use obviates the need for a seedling sensing mechanism, a signalling means, and a block advancement mechanism. It can also be combined with either a pickup embodiment or a push-off embodiment of the block placement means.

Immediately adjacent to and rearwardly of the gang blades are four square delivery tubes having top surfaces which are slotted to clear the seedling stems in the blocks. The tubes are preferably constructed of polished stainless steel so that the blocks can readily slide through them, but can be made of galvanized steel or other rust-resistant metal or a rigid plastic. These tubes are immediately adjacent as the files are fed thereinto from the gang saws or gang blades but soon diverge, while inclining downwardly and then horizontally at about a 45-degree angle above each furrow. These tubes form conveying channels which are preferably equipped with vibrating devices (not shown in the drawings) to move the blocks from the sawing or slicing operation to the discharge end of each tube which is being towed above its respective furrow.

At the discharge end of each tube in the push-off embodiment is an escapement mechanism which is regulated by common ground wheels. The mechanism advances the stick or file of blocks until a stem is sensed. It then stops the flow of blocks in that tube, holds back the next-to-last block, separates the last or end block of the stick, and pushes the end block out of the tube at zero ground speed into the furrow, which is preferably a trench or groove in the soil.

If a stem is not sensed by the sensing means in a particular delivery tube, i.e., if a dud block is present in that delivery tube, the escapement mechanism of the push-off embodiment continues to advance the stick of blocks until a second block has passed, then separates the next-to-last block and pushes the two end blocks out of the tube at zero ground speed into the furrow.

The separation mechanism for the push-off embodiment comprises a pair of conveyor belts straddling each delivery tube which engage the sides of the blocks and pushes them rearwardly and also comprises a pair of separation wheels which are disposed at the sides of the delivery tube at the very end thereof. These wheels have outwardly extending pins so that they penetrate and urge forwardly the embodiment block on the separation station. They move continuously and cause the endmost block to move outwardly and rearwardly at the same speed as the machine is itself moving forwardly. Thus the endmost block touches the ground, which is a very short distance therebeneath, at essentially zero ground speed. The small conveyor belts, however, move at a higher speed than the separation wheels, such as eight blocks per second, (whereas the separation wheels are moving at about two blocks per second) with a $\frac{3}{8}$-second pause every $\frac{1}{2}$ second. Using lettuce transplanting as an example, the transplanter is moving at 1.3 miles per hour or 23 inches per second so that the small conveyor belts are moving at 5.2 miles per hour or 92 inches per second. It is during that $\frac{3}{8}$ of a second, during which the block is being held motionless, that the separation wheels detach the endmost block from the next block.

The seedling sensing means is preferably disposed immediately above the next-to-endmost block. When it fails to sense a seedling, a signal is sent to the small conveyor belts so that they continue to move for another one eighth of a second, thereby delivering an additional block to the separation station, and pause for approximately one fourth of a second before continuing their pace. During that one fourth of a second, the continuously moving separation wheels are able to tear the next endmost block away from the succeeding block and deposit the endmost and the next-to-endmost blocks simultaneously rearwardly of the tube at zero ground speed.

This push-off embodiment has an additional advantage in that the bottom of each delivery tube is essentially at the bottom of the furrow and may even slide upon and smooth out the bottom. Furthermore, a pair of tiny mouldboard plows are attached to the end of each delivery tube. The share of each plow is partly outside of the adjacent side of the delivery tube and partly beneath its bottom, the landside of the plow is directly astern of the trailing end of the delivery tube and approximately at the bottom of the furrow, and the mouldboard of each plow barely grazes the side of the block, just as it leaves the trailing end of the delivery tube, and is slightly above its upper edge so that a small band of earth is constantly being lifted from the bottom of the furrow and turned over against each side of the block being deposited in the furrow, whereby the block is stabilized and immobilized practically at the moment of leaving the trailing end of the delivery tube.

Disposed rearwardly of the trailing end of the delivery tube in all embodiments are press wheels which firm the soil about the grow blocks and maintain them in upright position. The amount of soil that these press wheels move and firm about each block is considerably larger than the thin band of earth that the tiny plows press against the sides of the block in the push-off embodiment.

The pickup embodiment comprises a tong wheel as the block placement means for each delivery tube. This tong wheel is attached to and keyed to a shaft which is rotated by groundengaging wheels. A pair of cam guides are attached to the frame with struts or braces. The cam guides are circular and extend over approximately 45 degrees. The shaft is rotatably attached to and supported by the frame.

The tong wheel comprises:
A. a hub which is attached to the shaft; and
B. a pair of tong arms which are:
(1) attached to and radially disposed from the hub,
(2) spaced slightly further apart than the width of the blocks,
(3) flexible,
(4) equipped with a pair of outwardfacing cams which are adapted to engage the pair of cam guides, and
(5) equipped with a pair of inwardfacing pads which are adapted to grip one block at the separation station when the pair of tong arms are bent inwardly by contact of the pair of cams with the pair of cam guides.

The shaft which rotates each of the eight tong wheels is rotatably attached to the frame and is powered by a chain drive which is connected to a pair of rubber-tired ground wheels at the rear of the frame. The pair of pads are disposed at the tips of the tong arms. The shaft is located on the frame so that it is directly above the lower ends of the circular cam guides and is aligned at about 45 degrees with the upper ends of the cam guides so that the arcs through which pass the outer edges of the pads is tangential to the separation station and spaced slightly outwardly from the sides of the block located thereupon.

The slide embodiment comprises the simplest form of block advancement means for use in combination with the pickup embodiment as the block placement means. According to this embodiment, the sticks of blocks move down each polished stainless-steel delivery tube at about 45 degrees (the angle at which these blocks freely slide) and reach a separation station which is disposed several inches directly above the furrow. The delivery tubes are preferably equipped with vibrating devices in order to ensure delivery of sticks under all conditions of atmospheric humidity, wetness of the blocks, dirtiness of the tubes, and the like. The blocks are caught by a lip at the separation station and are exposed for pickup by the pairs of pads on the ends of the tong arms. This pickup occurs when the pair of cam guides engage a pair of cams and squeeze together a pair of tong arms, so that its pair of pads close upon and grasp the endmost block.

The lip is flexible, preferably being constructed of thin stainless steel, and is equipped with a strain gage. Separation of the endmost block from the adjacent block occurs because an L-shaped flap protrudes through the bottom of the delivery tube and holds the next block. But upon receiving a signal from the strain gage, a solenoid retracts the L-shaped flap, allowing the next block to slide down to the lip.

The pair of tong arms continues to be squeezed together by the cam guides until the block is directly beneath the shaft of the tong wheel and exactly within the furrow at essentially its bottom, when the cam guides release the cams and allow the tong arms to open up and release the block at zero ground speed with essentially no drop.

The delivery tube is approximately square in cross-section. Its top and sides are cut off several units from its end in order to allow the tong arms to move in their arcuate path toward the separation station, but the bottom one third of the sides are retained as a retaining border to prevent the files from falling off sideways.

The piston delivery embodiment comprises a piston and a piston rod, which are disposed in parallel to the files of blocks as the block advancement means. This embodiment also includes a stem sensing mechanism, such as a microswitch which is attached to the delivery tube. The bottom of the delivery tube is slotted longitudinally, and a push piston and a piston rod are attached therebeneath. At the end of the piston rod is a small pad which fits within the slot and has forward-slanting pins thereon as a uni-direction engagement surface. The piston rod is extended twice each second, so that its pins penetrate the bottom of one of the blocks and push that block forwardly for a distance equalling a single block, and is then retracted without engaging or disturbing the bottom of a block because of the slant of the pins. When a signal is received from the seedling sensing means that a dud block is present, the piston rod is quickly extended to cause the dud block to be pushed past the separation station and the next block to be engaged by the inwardly squeezed pads on the ends of the tong arms, so that both the dud block and the next block are carried together and deposited at the bottom of the trench without any delay whatsoever in the feed mechanism.

It is highly preferred that the seedling sensing means is disposed forwardly of the endmost block and that the signalling means comprises a delay counter which sends to the piston a signal that is delayed until a dud block becomes the endmost block, whereby the dud block is then advanced past the separation station. If the dud block happens to be the trailing block of a file, it is simply pushed out of the delivery tube and onto the tilled soil. However, if the dud block is any other block in a file, it is pushed past the separation station and hangs cantileverly past the lip of the separation station.

The bottom conveyor embodiment comprises a conveyor belt which is disposed beneath a delivery tube and in parallel thereto. It has a roughened or block-penetrating surface and operates within a longitudinal slot within the bottom of the delivery tube. It operates continuously to move the file of blocks toward and onto the separation station until stopped by a pawl-and-ratchet wheel mechanism when a sensing means has detected a seedling. Thus, in the unlikely event that two or more dud blocks are in linear sequence in a file, all such dud blocks are pushed past the separation station, to drop off if at the end of a stick or to be picked up with the next block having a seedling if within a stick.

In the separated-block embodiment of the cutting means, the separated blocks, sliced both ways, are stopped by a flexible lip, preferably rubber or spring-loaded thin stainless steel. The tong pads grasp only the endmost block, the duds having been removed by the operator, at about 2 per 6-second intervals.

If it is required for specific crops and/or locations, a water spray is directed at each seedling, subsequently to the press wheel operation. Timing of this water release is synchronized with the cut-off system in order to concentrate water at the seedling rather than covering the entire row.

The cakes which are stored on the trays of each tray table storage assembly are preferably similar to the molded cakes shown in FIG. 1 of U.S. Pat. No. 3,467,609. Other types of cakes that are suitable with some modification of the equipment are those shown in U.S. Pat. No. 3,712,252, U.S. Pat. No. 3,524,279, U.S. Pat. No. 3,513,593 and U.S. Pat. No. 3,553,079.

Unlike the Todd ® Planter Flats used in the Speedling ® system, these prior art cakes have in common the characteristic that they are conjoined at their bottoms by a tray-like structure which functions as a wick to provide uniform distribution of water among the blocks—a problem not addressed by the Speedling ® System. Because algae tend to grow on the tops of the blocks, where light is abundant, and there to form a skin-like surface that reduces moisture absorbency, it is advantageous to place the connecting webs, such as a tray-like structure, along the bottom edges of the blocks. Furthermore, such cakes can be formed of wood cellulose fibers or of polymermodified fibers in a wide variety of self-supporting shapes by standard pulp-molding or slushed-molding techniques or as fibrous mats by using modified papermaking machines, as is known in the fiberboard manufacturing art.

This tray-like structure conjoining the bottoms of the blocks is very useful for handling a group of blocks as a cake or unit. However, it possesses too much shear resistance, tear strength, and tensile strength, even when wet, for optimum incorporation in a high-speed mechanical transplanting system unless the tray-like structure is sawn or cut in both directions along the bottom of all blocks. Thus, these prior art cakes are suitable for use with a high-speed transplanter of this invention which includes the separated-block embodiment of its cutting means. In a transplanter having the separated-file embodiment, however, modified cakes are desirable.

Accordingly, a special mold is provided which has deeper sections on its cross dividers to create slot-like perforations between grow blocks in each file of 12 blocks. These perforations, however, are not as long as the width of the blocks. Thus, the blocks are conjoined only at their corners by their tray-like structure while formed into a cake, each block having on two opposing sides a triangular air space to provide natural air pruning for the seedlings in order to avoid bound root problems, as is known in the art, and a thin rectangular wall on the other two sides which extends to the slot-like perforations.

Specifically, these blocks are conjoined in merely two directions at their bottom corners after the cakes have been sliced or sawn through the triangular space to form sticks or files of 12 blocks. The benefit of this type of cake is that a much smaller effort is required for separating one block from another in a file while the entire cake can nevertheless be handled by the operator as a unit. Moreover, after cutting a cake into files, each file can be sequentially loaded into a delivery tube for effective feeding at the point of separation and transplanting. The separated-file embodiments described herein are illustrated in the drawings in combination with these modified blocks as an example of satisfactory operation of the high-speed transplanter.

The sensing means described herein and illustrated in the drawings are microswitches and sensing arms. However, other types of sensing devices are feasible, such as photocell detectors, air sensors, and the like. A double-acting hydraulic or pneumatic cylinder, respectively, powered by the tractor's hydraulic system or by an on-board air compressor or a stored gas cylinder, is a suitable knife drive for a transversely disposed guillotine knife that can separate the blocks in a file or stick by slicing through the conjoined bottom corners. Indeed, prior art cakes (having no slot-like perforations in their tray-like structures) can be used if the high-speed transplanter has the separated-file embodiment of the cutting means in combination with such a guillotine knife. However, it is preferred to pull the blocks apart, by selective operation of the block advancement means and the block placement means, when using the slotted cakes of this invention.

The high-speed transplanter is preferably built in modules so that replacements of vulnerable parts can be quickly made in the field and so that the transplanter can continue in service while shop repairs are being made. Logical modules are the roto-till or mini-mulcher unit (two rows) with hydraulic motor, the saw or blade assembly with hydraulic motor, furrow shaper parts, final feed mechanism with drive, plant sensor, conveyor belt assemblies, piston assemblies, seedling sensing assemblies, and the like.

DESCRIPTION OF THE PREFERRED EMBODIMENTS

Figure 1:
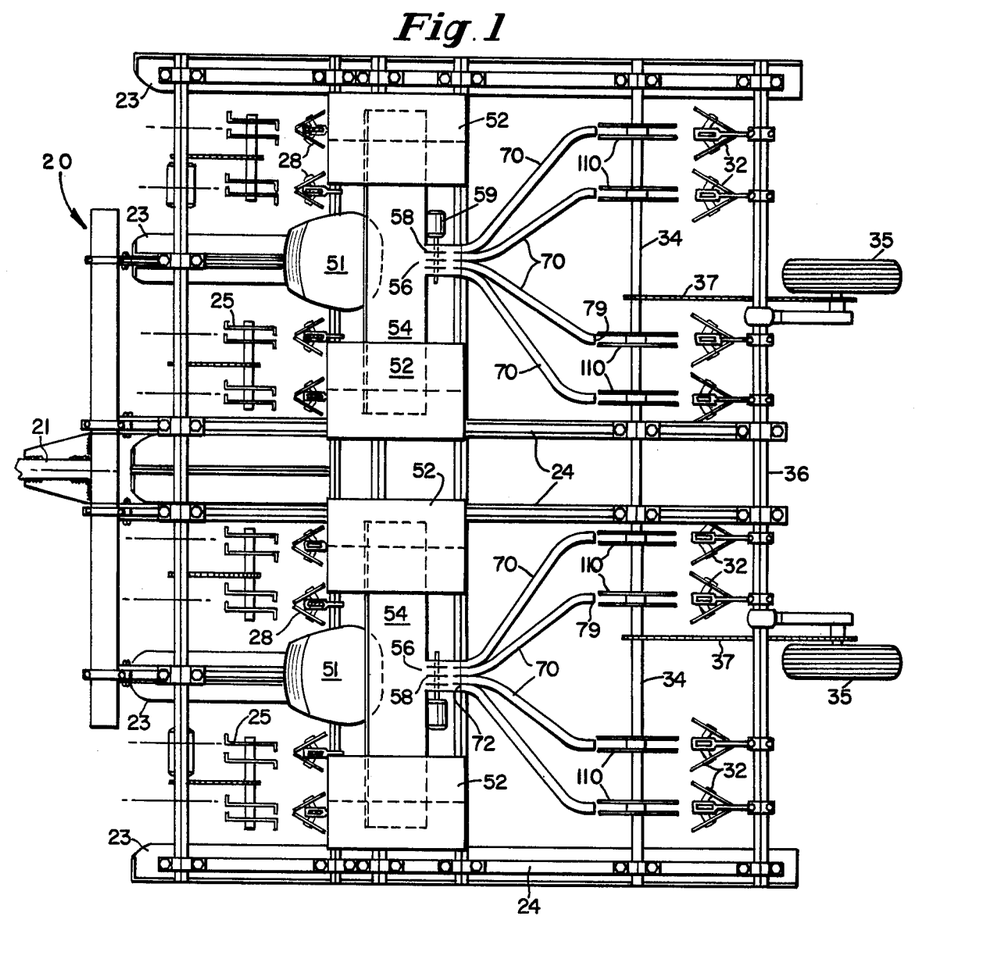
FIG. 1 is a plan view of a high-speed transplanter of this invention, having two operator stations and eight delivery tubes for simultaneously planting eight grow blocks containing seedlings.
Figure 2:
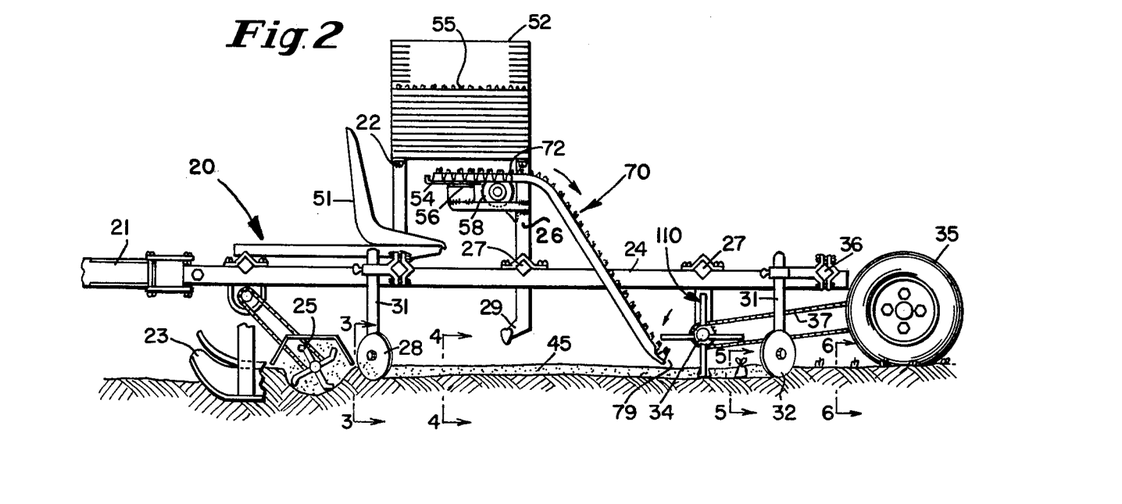
FIG. 2 is a side elevation of the high-speed transplanter shown in FIG. 1.

The high-speed transplanter of this invention, as shown in plan view in FIG. 1 and in side view in FIG. 2, comprises a frame including a pull pitch 21, upper toolbars 22, frame channels 24, riser brackets 26, main toolbars 27, a footrest 29, and vertical posts 31. The transplanter further comprises mini-mulchers 25 of a roto-tiller type for conditioning the soil, runner shoes 23 for shaping beds, discs 28 for opening furrows therein, and discs 32 for closing the prepared furrows around the transplanted grow blocks.

Suitable components for constructing such a frame of almost any reasonable configuration are available from Marvin Landplane Company, P.O. Box 209, Woodland, California 95695. The transplanter additionally comprises a transversely disposed shaft 34 which is attached to and rotated by traction wheels 35, a rear toolbar 36, chain drives 37 for shaft 34, and tong wheels 110. The transplanter still further comprises a pair of tray racks 52 for each operator, an operator seat 51 between each pair of racks 52, a cutting station 56 which is disposed rearwardly of each operator seat 51, a tray table 54 extending beneath these racks 52 and in front of each cutting station 56, a gang saw or gang blade assembly 58, and a cutting motor 59. The transplanter finally comprises four delivery tubes 70 for each cutting station 56.

Figures 10, 11, 12:
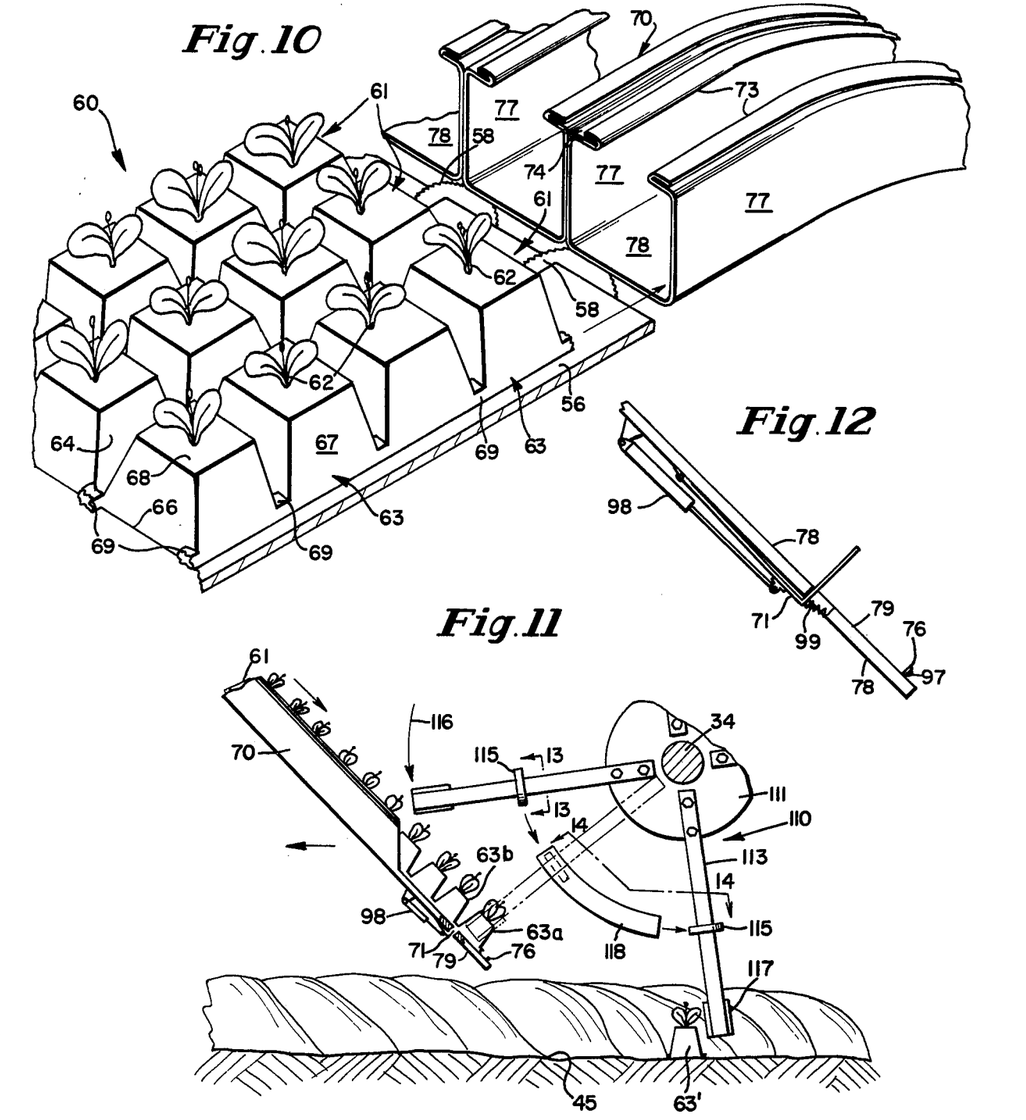
FIG. 10 is a perspective fragmentary view of a cake of preferred grow blocks, made with the mold of FIG. 9, being sliced into sticks and about to enter a row of delivery tubes which are side by side and aligned with the spaces between the blades.
FIG. 11 is a partial side view of a tong wheel, a cam guide, and the separation station of a delivery tube, showing the sequences of pick-up, transport, and deposit of a seedling block within a furrow.
FIG. 12 is an enlarged side view of the separation station seen in FIG. 11.
Figures 15, 16, 17, 18, 19, 20:
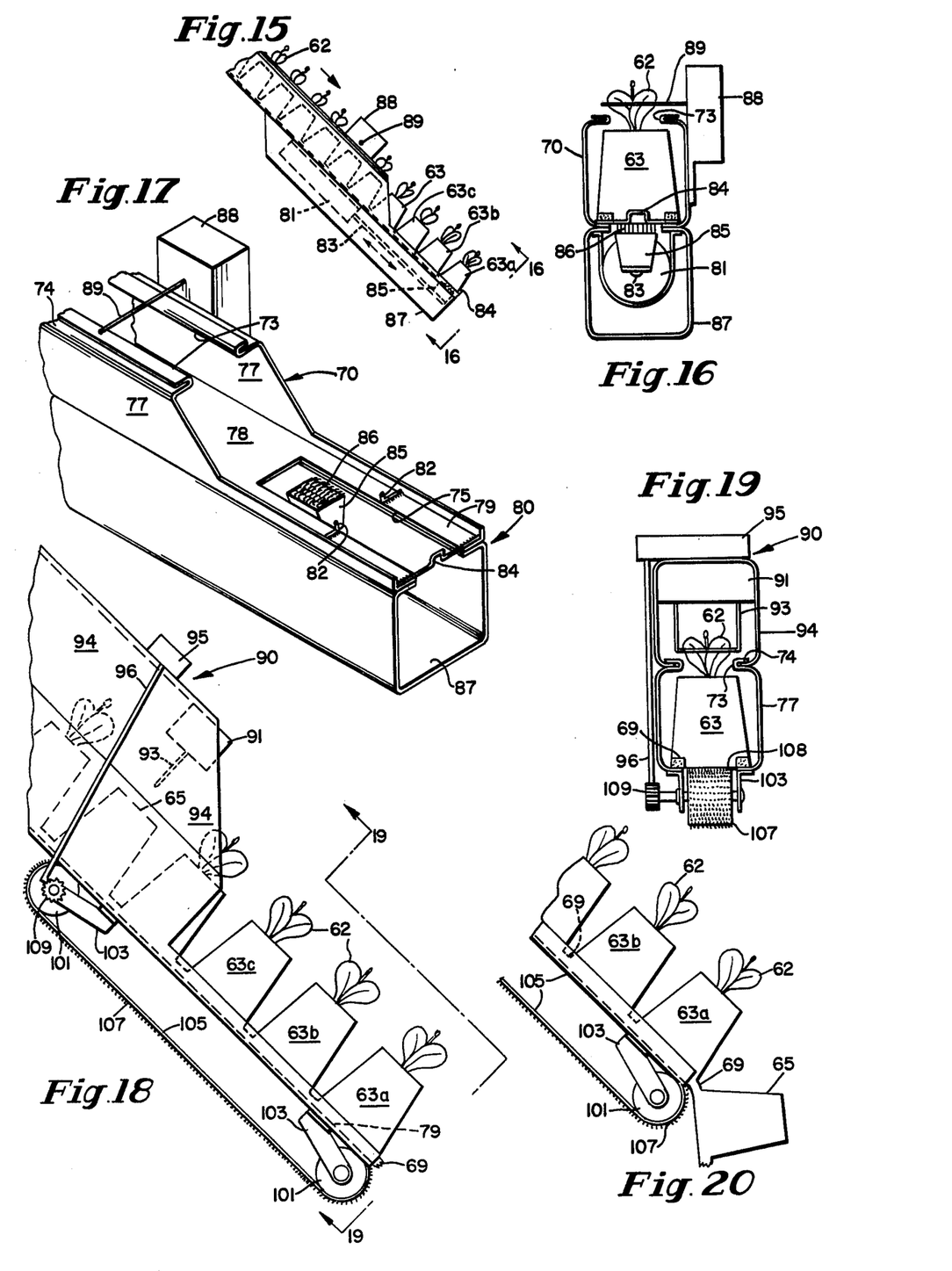
FIG. 15 is a side view of a terminal portion of a delivery tube and the position delivery embodiment for use in combination with a tong wheel.
FIG. 16 is an end view of the delivery tube and piston shown in FIG. 15, taken in the direction of the arrows crossing the line 16—16 in FIG. 15.
FIG. 17 is a perspective view of the slotted delivery tube and piston delivery embodiment shown in FIGS. 15 and 16, without seedling blocks thereupon.
FIG. 18 is a side view of the separation station of a delivery tube which is equipped with the bottom conveyor embodiment.
FIG. 19 is an end view, taken in the direction of the arrows crossing the line 19—19 in FIG. 18, showing the delivery tube, the bottom conveyor, the signalling device, the microswitch and U-shaped sensor arm, and the microswitch guard.
FIG. 20 is a fragmentary side view, similar to FIG. 18, that shows a dud block being pushed beyond the separation station, to be picked up and deposited simultaneously with the next-to-endmost block.
Figure 21:
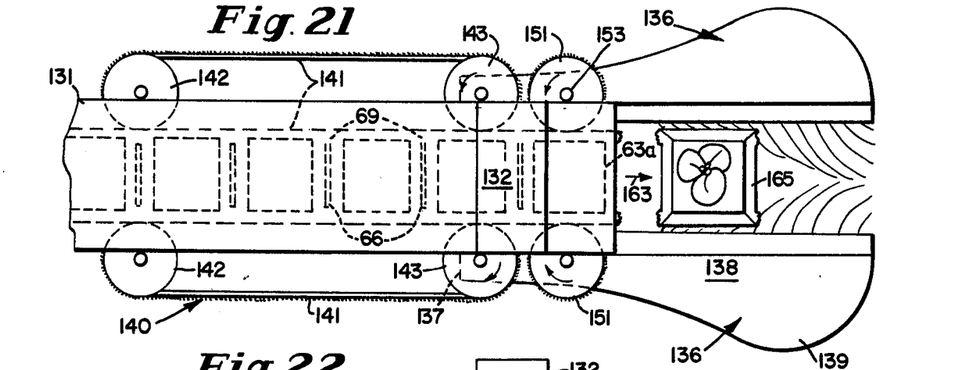
FIG. 21 is a top view of a covered delivery tube and a side conveyor embodiment as the block transportation means in combination with a pair of small plows for stabilizing the deposited blocks.

Twenty trays 55 are stored in each row of each rack 52. A tray containing eight cakes is removed from rack 52 and is placed on tray table 54. Cakes 60 are sequentially placed on cutting station 56, as shown in FIG. 10, where a cake 60 is being cut into sticks 61 by blades 58. Each stick 61 comprises 12 grow blocks 63 of which on a statistical basis one may be a dud block 65, as indicated in FIG. 20, the remainder being seedling blocks containing a seedling 62.

Figure 9:
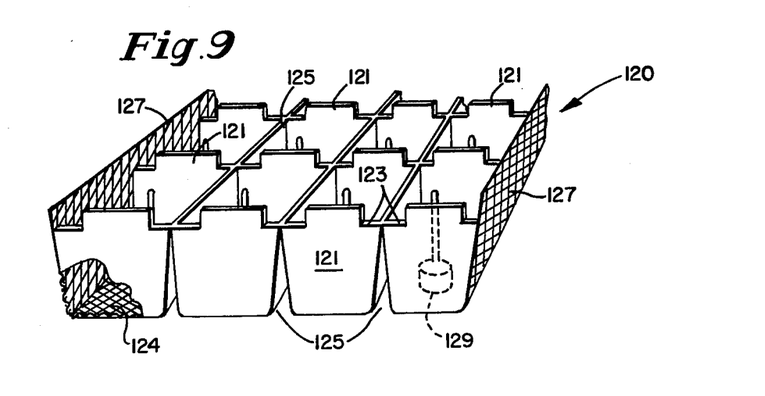
FIG. 9 is a perspective view of a mold used for forming a cake of preferred grow blocks for use with the transplanter shown in FIGS. 1 and 2, the top of the mold as shown forming the base of the cake.

The preferred grow blocks are conjoined along two sides and at each corner and are preferably molded with the mold 120 shown in FIG. 9. This mold 120 has 48 pins 129, to form a seed depression in each grow block, and also has vertical partitions 121 for forming wells 66 between adjoining blocks 63, as seen in FIG. 10. Vertical partitions 121 have deeper recessions 123 which permit formation of conjoined corners 69 in the traylike structure of a cake. Mold 120 also comprises wedge-shaped partitions 125, for forming inclined sides 64 of block 63, and boundary sides 127, for forming vertical elongated sides 67 of cakes 60. Boundary sides 127 and bottom 124 of mold 120 are formed of screen material to enhance drainage.

Before a cake 60 is sliced into files or sticks 61, the grow blocks are conjoined in the bottom portions of sides 64 and in the bottom portions between wells 66. After sticks 61 have been formed by blades 58, blocks 63 are conjoined only at corners 69, whereby the areas of conjuncture are merely a small percentage of the total cross-sectional area of a block 63. The cross-sectional area of a pair of sliced corners 69 is, nevertheless, strong enough for the slight handling of a stick 61 that is necessary for transportation to the separation station, and the cross-sectional area of conjoined corners 69 before such slicing by a blade 58 imparts ample strength for handling an entire cake 60 during the manual operation of picking up a cake from a tray 55 on tray table 54 and placing it on cutting station 56.

Figure 22:
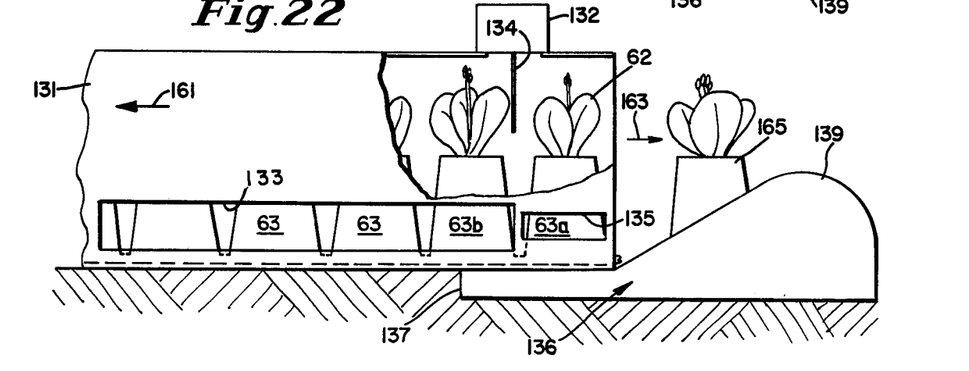
FIG. 22 is a side view, partially in section, of the delivery tube and plows shown in FIG. 21, with the conveyor and the separating wheel removed to show the openings therefor.

As shown in FIG. 10, slotted delivery tubes 70 comprise bottoms 78, sides 77, tops 74, and a top slot 73. Seedlings 62 extend through slots 73. Closed delivery tubes 131 are sufficiently large that seedlings 62 are completely enclosed therewithin, as indicated in FIG. 22. They have an entrance end 72 and a separation station 79, as indicated in FIG. 2. In some embodiments, tubes 70 are provided with a terminal lip, exemplified by lip 76 in FIGS. 11 and 12, and by lip 84 in FIG. 17.

PICKUP EMBODIMENT OF BLOCK PLACEMENT MEANS

Figure 7:
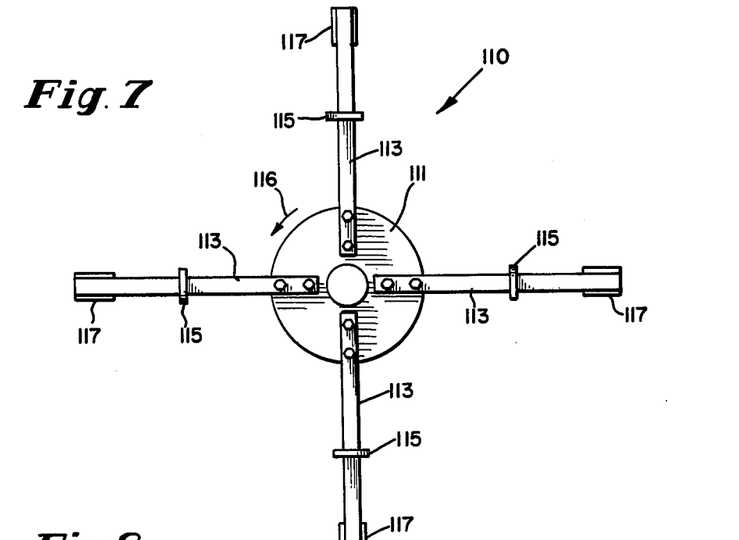
FIG. 7 is a side view of a tong wheel seen in FIGS. 1 and 2.
Figure 8:
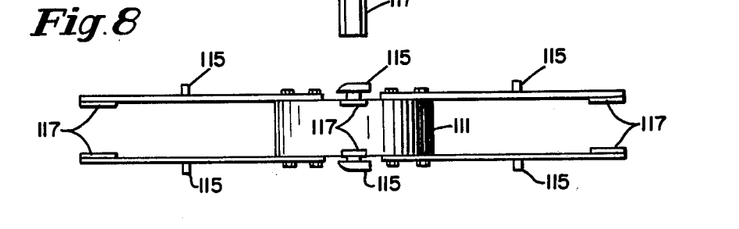
FIG. 8 is a top view of the tong wheel shown in FIG. 7.

The pickup embodiment is shown in FIGS. 7, 8, and 11. Tong wheel 110 comprises a simple hub 111 which is attached, as by keying, to shaft 34, tong arms 113 which are attached to hub 111 on opposite sides thereof, a pair of cams 115 which are attached to arms 113 and face outwardly thereof, and a pair of pads 117 which are attached to arms 113 near their end and face inwardly thereof. Tong wheel 110 rotates in direction 116. Tong arms 113 are flexible and are preferably made of spring steel. Cam guides 118 are attached to the frame of the transplanter by longitudinally disposed struts or braces 119 which can be attached to channels 24, vertical posts 31 and/or toolbars 27. Cam guides 118 are quadrantal, their forward edges being aligned approximately with shaft 34 and with a separation station 79 and their rearward edges being directly beneath shaft 34.

Tong wheel 110 is used in each pickup embodiment of this invention as the preferred block placement means. The size of tong wheel 110 depends upon the crop being transplanted. When transplanting lettuce, for example, for which the spacing within the bed is commonly $11\frac{1}{2}$ inches, the tong wheel is four times $11\frac{1}{2}$ inches in circumference, measured at the outermost tips of arms 113.

SLIDE EMBODIMENT OF BLOCK ADVANCEMENT MEANS

The slide embodiment is the simplest form of the block advancement means to be used in combination with tong wheel 110 and is shown in FIGS. 11-14. It is preferably combined with vibrating devices attached to each delivery tube 70.

The slide embodiment comprises a separation lip 76 to which is attached a strain gauge 97, at the end of separation station 79, and a hinged flap 71 which is hingeably attached to the underside of delivery tube 70 and protrudes through a slot in the bottom thereof, as indicated in FIG. 11. Hinged flap 71 is pulled downwardly by a solenoid 98 and is returned by a spring 99. Solenoid 98 is responsive to a signal from strain gauge 97 when pads 117 grasp a block 63 and pull it past and over lip 76 which is flexible, preferably of thin, stainless steel so that strain gauge 97 is readily activated. This sudden force breaks the two conjoined corners 69 between block 63a that is grasped and the succeeding block 63b which is caught on the upturned portion of L-shaped flap 71. Immediately thereafter, solenoid 98 pulls flap 71 downwardly and allows stick 61 to slide downwardly until its endmost block 63b contacts lip 76.

If a sensing means (not shown in FIGS. 11-14 but clearly illustrated in FIGS. 15-19 and 22 for other embodiments) detects the absence of a seedling, i.e., a dud block, solenoid 98 receives a signal which causes it to retract flap 71 before receiving a signal from strain gauge 97, thus allowing the next block (almost invariably a seedling block) to be grasped by pads 117. As it slides past the open slot above the withdrawn flap 71, solenoid 98 releases flap 71 and spring 99 pulls its upturned portion into the slot so that it catches the walls of the third block, thereby causing conjoining area 69 to separate between the second and third blocks, so that the dud block and the succeeding block are pulled away together by the next tong arm 113.

Figure 13:
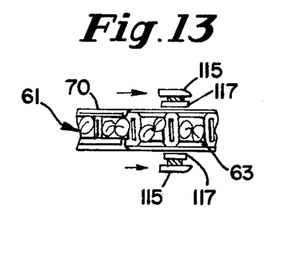
FIG. 13 is a sectional view through a tong arm, taken in the direction of the arrows crossing the line 13—13 in FIG. 11.
Figure 14:
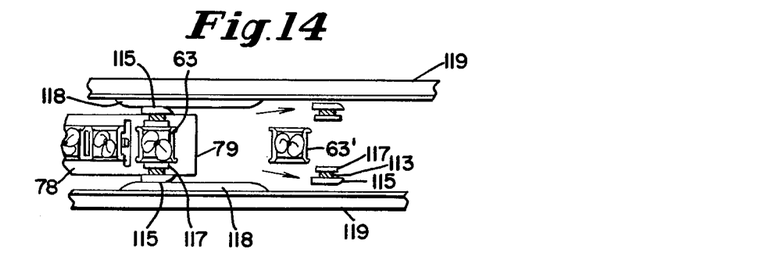
FIG. 14 is a sectional view through tong arms in two positions to illustrate the function of a cam guide, taken in the direction of the arrows crossing the line 14—14 in FIG. 11.

Movement of an arm 113 to a delivery tube 70 and its cargo of blocks 63 is shown in FIG. 13 as a top view. Grasping of a block 63 by pads 117 as cams 115 are pushed inwardly by cam guides 118, which are supported by struts 119, is shown in the left side of FIG. 14. Release of the transplanted seedling block 63' is shown in the right side of FIG. 13, with arms 113 having sprung apart again after being released by cam guides 118.

Figures 3, 4:
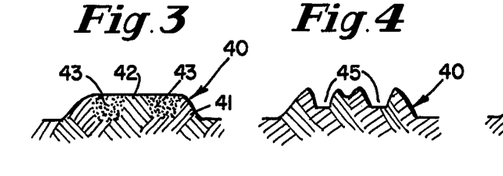
FIG. 3 is a sectional elevation through the bed formed by the mini-mulcher and plows shown in FIGS. 1 and 2, taken in the direction of the arrows crossing the line 3—3 in FIG. 2.
FIG. 4 is a sectional elevation, similar to FIG. 3, after formation of a part of furrows, taken in the direction of the arrows crossing the line 4—4 in FIG. 2.
Figures 5, 6:
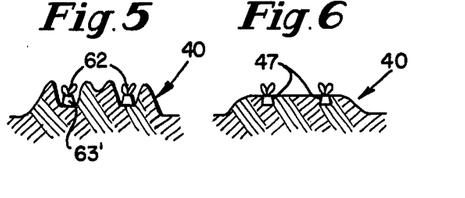
FIG. 5 is a sectional elevation, similar to FIGS. 3, and 4, showing the same bed with seedling blocks placed therein, taken in the direction of the arrows crossing the line 5—5 in FIG. 2.
FIG. 6 is a sectional elevation of the same bed shown in FIGS. 3-5, with the seedling blocks firmed into place with soil, taken in the direction of the arrows crossing the line 6—6 in FIG. 2.

Furrows 45 into which block 63 are placed are shown in FIGS. 3-6 which are cross sections taken from FIG. 2. A prepared bed 40 has sides 41, a top 42, and mulched strips 43, as seen in FIG. 3. Furrows 45 appear after passage of discs 28, as shown in FIG. 4. FIG. 5 shows emplaced seedling blocks 63' and thus corresponds to FIG. 14. FIG. 6 shows emplaced blocks 63' which are surrounded by firmed soil 47 after passage of disc 32 which close prepared furrows 45.

PISTON DELIVERY EMBODIMENT OF BLOCK ADVANCEMENT MEANS

The piston delivery embodiment is shown in FIGS. 15-17 and is suitable for use with tong wheel 110.

The piston delivery embodiment comprises a microswitch 88 and sensor arm 89, as the seedling sensing means, which are attached to one side of each delivery tube 70, a piston 81 and piston rod 83 which are attached to the underside of each delivery tube 70, and a longitudinal slot 75 in bottom 78 in which a pad 85 on the end of rod 83 moves. A tubular piston guard 87 surrounds and protects piston 81 and piston rod 83 and is attached to bottom 78 of each tube 70. Forward slanting pins 86 on the top surface of pad 85 protrude sufficiently within slot 75 to engage the bottoms of grow blocks 63 during each rearward movement but do not disturb the bottoms thereof during retraction of rod 83. Across the very end of delivery tube 70 is a wire guard 84, and approximately the length of one block thereabove is an additional wire guard 82 into two flexible segments straddling slot 75. Terminal station 79 is defined as the space between guards 82, 84. Piston 81 has sufficient force to push a block 63 past separation guard 82 into terminal station 79 where it rests against terminal guard 84, but when pads 117 grasp block 63a, guard 82 restrains the next block 63b sufficiently to break conjoined corners 69.

If sensor arm 89 detects the lack of a seedling, i.e., a dud block, piston 81 retracts and advances twice to push the dud block over terminal guard 84, either hanging there or falling away if it is the last block of the stick.

BOTTOM CONVEYOR EMBODIMENT OF BLOCK ADVANCEMENT MEANS

The bottom conveyor embodiment is shown in FIGS. 18-20 and is suitable for use with tong wheel 110.

The bottom conveyor embodiment comprises conveyor belt 105 having an engagement surface 107, such as protruding pins or Velcro thereupon, which operates within a slot 108 in bottom 78 of delivery tube 70. Conveyor 105 moves on rollers 101 which are attached to the bottom of the delivery tube 70 by lugs 103. Forward roller 101 is provided with an escapement 109 which is acted upon by a signal arm 96 attached to a signal switch 95 which responds to a microswitch 91 and U-shaped sensor 93, all of which are attached to or housed within a microswitch housing 94 above each delivery tube 70, as particularly shown in FIG. 19.

Blocks 63 move downwardly in this bottom conveyor embodiment entirely under the control of conveyor 105 which moves continuously unless stopped by signal arm 96 in response to a signal received through a delay counter that a seedling 62 has been detected by U-shaped sensor 93. Consequently, in the unlikely event that two or more seedlings 62 are missing so that there are a string of dud blocks 65, conveyor 105 continues to move and causes one or more blocks 65 to hang from the end of delivery tube 70, as shown in FIG. 20, so that the seedling block 63a at the very end of the tube is picked up and squeezed by pads 117 while dud blocks 65 are carried therealong. The sudden force exerted by pads 117 is amply sufficient to break conjoined corners 69 between blocks 63a and 63b.

It is alternatively feasible to operate conveyor 105 with a variable speed motor which, in response to a signal from microswitch 91, momentarily speeds up to deliver dud block 65 plus block 63a to the terminal station 79 at the very end of delivery tube 70. This alternative construction for bottom conveyor embodiment enables conveyor belt 105 to operate continuously at a speed adjusted to coincide with the circumferential speed of tong wheel 110 except when a dud block 65 is sensed and reported, preferably through a delay counter to compensate for the distance between the block sensed by arm 93 and block 63a.

PUSH-OFF EMBODIMENT OF THE BLOCK PLACEMENT MEANS

Figure 23:
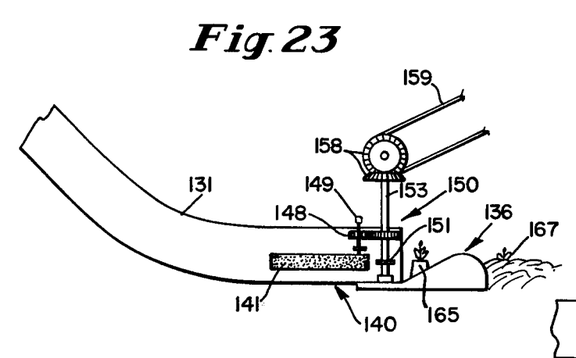
FIG. 23 is a side view, similar to FIG. 22, that shows a larger portion of the delivery tube and one embodiment of the drive mechanism of the separating wheel.
Figure 24:
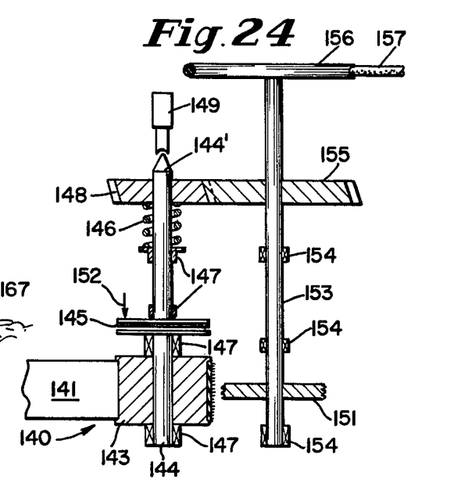
FIG. 24 is a sectional side elevation of a terminal station showing the drive for the conveyor belt and the separating wheel, with another embodiment for the drive mechanism.
Figure 25:
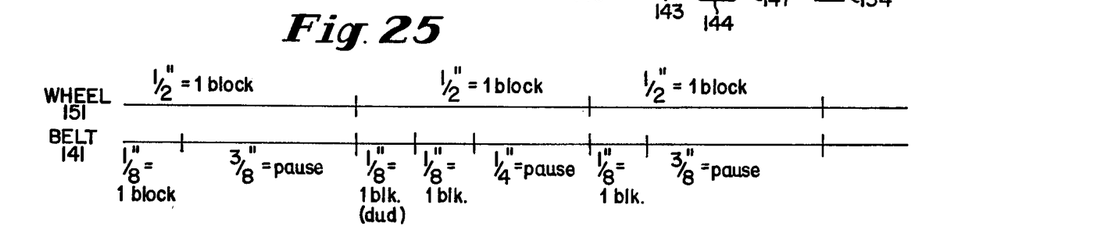
FIG. 25 is a schematic representation of a simultaneous operation for the separating wheel and conveyor belt of FIGS. 21-24 which shows the timed operating sequence with a seedling block, a dud block, and a seedling block.

The push-off embodiment is shown in FIGS. 21-24, and its operation is schematically described in FIG. 25. It is not intended for use with tong wheel 110.

In this embodiment, closed delivery tubes 131 have sufficient height that seedlings 62 have ample room to be contained therewithin and are not slotted at the tops thereof. A microswitch 132 having a sensor arm 134 is attached to the top of tube 131 near its end, so that arm 134 detects a seedling on the next-to-last block 63b. A pair of conveyor belt assemblies 140, each comprising conveyor belt 141, idler roller 142, drive roller 143, shaft 144 for the drive roller, a clutch 145, a spring 146, bearings 147, a slave gear 148 and a solenoid 149, are the block advance means. Rollers 143 are keyed to shafts 144 which are supported by bearings 147 and attached to delivery tube 131. One side of each belt conveyor 141 protrudes slightly into the interior of each delivery tube 131 through belt openings 133, so that they contact the sides of blocks 63 and downwardly carry sticks 61 toward separation station 79.

A separating wheel assembly 150, as the block placement means, comprises, in pairs, a separating wheel 151, a support shaft 153 to which wheel 151 is attached, bearings 154 which are attached to adjacent tube 131 and support shaft 153, a drive gear 155 which meshes with slave gear 148, and a pulley 156 powered by belt 157, as shown in FIG. 24, or alternatively, bevel gears 158 and belts 159, as shown in FIG. 23. A solenoid shaft 144' is attached to gear 148 and is rotatively attached to delivery tube 131 by bearings 147. A compression spring 146 is interposed between upper bearing 147 and gear 148. A solenoid 149 is disposed above the upper end of shaft 144' and is actuated by microswitch 132 and sensor arm 134 on top of delivery tube 131. Separating wheel 151 rotates continuously within wheel opening 135, and gear 148, shaft 144' to which gear 148 is attached, and the upper clutch disc of clutch 145 also rotate continuously.

Because the diameters of gears 148, 155 have a ratio of 1:4, belt conveyors 141 move at a peripheral speed that is eight times as great as the peripheral speed of wheels 151. However, belts 141, preferably having a block-engaging surface, move only when the discs of clutch 145 are pressed together as shown by arrow 152 in FIG. 24.

Attached to each side of delivery tube 131 at the very end thereof are a pair of very small plows 136, comprising plowshares 137, landslides 138 and mouldboards 139. Plowshares 137 extend slightly below the bottom of each delivery tube 131 and into the soil at the bottom of a furrow 45 upon which the delivery tube preferably slides, and landslides 138 extend inwardly and almost to the sides of each deposited block 165. Mouldboards 139 rise almost to the height of blocks 165 so that a thin band of earth is lifted from the bottom of the furrow along each side of each block 165 to hold it firmly in place until discs 32 compress the sides of furrow 45 against it to complete the transplanting operation, as seen in FIG. 6.

FIG. 25 shows schematically the sequence of operations for wheels 151 and 141. The line for wheels 151 shows onehalf second, representing one block. The line for belts 141 shows one-eighth second, equalling one block, so that there is time for a ⅜th-second pause when a block 63 is a seedling block. Referring to FIG. 22, during that pause occupying ⅜th second, wheels 151 separate block 63a from block 63b and push it outwardly in direction 163 at exactly the same rearward speed as delivery tube 131 is moving forwardly in direction 161. Thus, pushed-off block 165, as it contacts the bottom of furrow 45, is moving at zero ground speed and is in no danger of toppling over. However, to be certain thereof, plows 136 lay a thin strip of earth on each side of block 165 to form a stabilized block 167, ready for final covering and firming by plows 32 of the high-speed transplanter.

When microswitch 132 and sensor arm 134 fail to detect a seedling 62 in block 63b, belt conveyors 141 continue to run an additional ⅛th second, as shown in the middle of FIG. 25, and pause for ¼th second, thereby pushing the dud block beyond the rearward end of delivery tube 131. During that pause, wheels 151 tear away block 63a, as indicated in FIG. 22, from block 63b along their conjoined corners 69. The dud block is now rearward of block 63a and attached thereto as block 63a is grasped by wheels 151 and pushed to the rear as ejected block 165. Both the dud block and the ejected block 165 continue to be attached together and both are steadied and firmed by the thin bands of earth from plows 136. After passage of the dud block, conveyor belt 141 resumes moving for ⅛th second and pausing for ⅜th second, as shown at the right side of FIG. 25, in response to movement of solenoids 149 and engagement of the discs of clutch 145.

This push-off embodiment has the advantage of not requiring cooperative operation of tong wheel 110. Its belts 157, 159 suitably receive power from shaft 34, using pulleys attached thereto which are sized to provide whatever precise spacing is desired between the planted grow blocks. Conveyors 141 are desirably covered with guards to keep out dirt and protect the moving parts. Gears 148, 155, 158 and bearings 147, 154 are suitably made of a strong plastic, such as nylon.

Because it will be readily apparent to those skilled in the transplanting art that innumerable variations, modifications, applications, and extensions of the examples and principles hereinbefore set forth can be made without departing from the spirit and the scope of the invention, what is herein defined as such scope and is desired to be protected should be measured, and the invention should be limited, only by the following claims.

What is claimed is:

1. In a high speed transplanter for transplanting seedlings grown in grow blocks which are arranged on said transplanter as a plurality of files of seedling blocks which contain at least one seedling and of dud blocks which lack a seedling, wherein said transplanter comprises a frame which is rotatively supported by wheels and a block movement means, including a delivery tube, for advancing said plurality of files, longitudinally aligned and disposed end-to-end, rearwardly and downwardly toward a furrow in soil therebeneath, the improvement for replacing each said dud block with a following grow block which is statistically likely to be a seedling block, whereby planting efficiency can be increased by producing a more perfect stand, comprising:
   A. a seedling sensing means for sequentially detecting the presence of a seedling in each seedling block of said plurality of files;
   B. a signaling means, connected to said seedling sensing means, for indicating a dud block in which said presence is not detected; and
   C. a block advancement means for additionally advancing any said file, in which said each dud block is indicated, through a distance equalling the length of at least one block, whereby a selected following block is planted in addition to said dud block.

2. The improvement in the transplanter of claim 1, wherein: A. said grow blocks are conjoined within said files; and
   B. said transplanter further comprises a block separation means for forcibly separating each said seedling block from the following block but not for separating any said dud block from the following block in one of said files of conjoined blocks.

3. The improvement in the transplanter of claim 2, wherein:
   A. said grow blocks are conjoined both longitudinally and transversely to form multi-unit cakes; and
   B. said high-speed transplanter further comprises:
      (1) a storage assembly for said cakes which is mounted on said frame,
      (2) a cutting station upon which said cakes are sequentially disposed, and
      (3) a cutting means for separating said sequentially disposed cakes into a plurality of said files of said conjoined blocks.

4. The improvement in the transplanter of claim 3, wherein:
   A. the terminus of said delivery tube is disposed at about 45° to said soil; and
   B. a tong wheel is rotatively attached to said frame as a block placement means for grasping the block at said terminus and for depositing said grasped block at a selected location and in upright position in said soil, said tong wheel comprising a pair of tong arms having inward-facing pads for said grasping and a pair of cams which cause said pair of tong arms to be bent inwardly when said cams contact a pair of cam guides which are attached to said frame.

5. The improvement in the transplanter of claim 4, wherein:
A. said files move by gravity through said delivery tube; and
B. said block separation means comprises a first retention means at said terminus for retaining the endmost block of any said file that is moving downwardly within said delivery tube.

6. The improvement in the transplanter of claim 5, wherein said separation means further comprises a second retention means which is disposed the length of one said block forwardly of said first retention means, the space between said first and second retention means being a separation station.

7. The improvement in the transplanter of claim 6, wherein said first retention means is a terminal lip which is flexible and is provided with a strain gage or microswitch attached thereto.

8. The improvement in the transplanter of claim 7, wherein said strain gage or microswitch is activated when said pair of inward-facing pads grasp said endmost block at said first retention means while revolving past said separation station.

9. The improvement in the transplanter of claim 8, wherein a hinged L-shaped flap protrudes through a transverse slot in the bottom of said delivery tube and prevents the next-to-endmost block from following said endmost block during said revolving of said pads, whereby said endmost block and said next-to-endmost block are forcibly torn apart along conjoined corners thereof.

10. The improvement in the transplanter of claim 9, wherein said L-shaped flap is:
A. hingeably attached to the bottom of said delivery tube;
B. hingeably operated by a solenoid in response to a signal from said strain gage or said microswitch; and
C. returned into said transverse slot by a tension spring which is attached to said delivery tube.

11. The improvement in the transplanter of claim 10, wherein a signal indicating a dud block causes said solenoid to:
A. retract before receiving a signal from said strain gage or microswitch;
B. withdraw said L-shaped flap from said transverse slot;
C. allow said pair of pads to pull both said endmost and said next-to-endmost block simultaneously from said separation station, said endmost block being said dud block; and
D. hold said L-shaped flap underneath the bottom of said delivery tube until said next-to-endmost block is nearly past said transverse slot, whereupon said spring returns said L-shaped flap into said slot and beyond said bottom of said delivery tube to catch the succeeding block and to cause portions conjoining said succeeding block to said next-to-endmost block to be ruptured, as said pads pull upon said next-to-endmost block.

12. The improvement in the transplanter of claim 4, wherein said block advancement means comprises a piston and a piston rod which are disposed in parallel to said files, the outer end of said piston rod having a unidirectional engagement surface which moves within a longitudinal slot in the bottom of said delivery tube, whereby said engagement surface contacts the bottoms of said blocks.

13. The improvement in the transplanter of claim 12, wherein said engagement surface comprises forward-slanting pins which penetrate a block when said piston rod is advanced but do not penetrate said block when said piston rod is retracted.

14. The transplanter of claim 13, wherein said seedling sensing and signaling means is disposed forwardly of said endmost block and said signaling means comprises a delay counter which sends to said piston a signal that is delayed until said dud block becomes said endmost block, whereby said dud block is advanced past said terminus.

15. The improvement in the transplanter of claim 4, wherein said block advancement means comprises an endless belt conveyor which is rotatably attached to said delivery tube beneath the terminus thereof and protrudes through the bottom of said delivery tube through a slot therein, said endless belt having a block-engaging surface.

16. The improvement in the transplanter of claim 15, wherein said belt conveyor runs continuously as said block advancement means until stopped by a signaling means which responds to said seedling sensing and signaling means that a seedling block is entering said separation station.

17. The improvement in the transplanter of claim 16, wherein said seedling sensing and signaling means comprises:
A. a microswitch which is attached to a housing above said delivery tube;
B. a sensor arm which detects said seedlings and is connected to said microswitch;
C. a signal switch which is attached to said housing and is connected to said microswitch;
D. a signal arm which is actuated by and connected to said signal switch; and
E. an escapement wheel which is rigidly attached to a roller on which runs said belt conveyor, said escapement wheel being stopped by engagement with said signal arm when said signal arm is actuated by said signal switch because a seedling has been detected.

18. The improvement in the transplanter of claim 17, wherein presence of a dud block in any said file of blocks causes said belt conveyor to continue moving without engagement of said escapement wheel by said signal arm until a seedling is detected, whereby said dud block hangs from the rearward end of said belt conveyor as said endmost block and is carried to said soil while attached to said next-to-endmost block which is grasped by said pads.

19. The improvement in the transplanter of claim 4, wherein said delivery tube curves to form a portion that is parallel to said furrow and rides slidingly therewithin to form a separation station for operation of said separation means.

20. The improvement in the transplanter of claim 19, wherein said seedling sensing and signaling means comprises a microswitch which is attached to the top of said delivery tube and a sensor arm which extends therebeneath to detect seedlings passing thereby.

21. The improvement in the transplanter of claim 20, wherein said block advancement means comprises:

A. a pair of side conveyor belts which straddle said separation station and protrude into the interior thereof through side openings in said delivery tube;
B. a roller shaft to which is attached one roller driving said conveyor belts;
C. a disc clutch to one disc of which said roller shaft is attached;
E. a solenoid shaft to which the other disc of said disc clutch is attached;
F. a slave gear;
G. a return spring which urges said disc clutch apart; and
H. a solenoid which engages one end of said solenoid shaft and forces said discs of said disc clutch into parallel engagement in response to a seedling-detecting signal from said sensing and signaling means.

22. The improvement in the transplanter of claim 21, wherein said separation means comprises:
A. a pair of separating wheels which straddle said separation station and protrude through the sides thereof through side openings in said delivery tube, said separating wheels being disposed rearwardly of said side conveyor belts;
B. a pulley which receives power from a shaft on said frame;
C. a separating shaft which is attached to said pulley and to said separating wheels; and
D. a drive gear which is attached to said separating shaft and engages said slave gear.

23. The improvement in the transplanter of claim 22, wherein said separating wheels move at four times the speed of said conveyor belts, whereby said conveyor belts advance one block during a time interval of one-eighth second and pause for a time interval of ⅜th second while said separating wheels move for ½ second when one said seedling block is sensed by said sensor arm.

24. The improvement in the transplanter of claim 23, wherein said conveyor belts continue to move for an additional ⅛ second to provide an additional block onto said separation station when said sensor arm fails to detect said one seedling block and pause for a time interval of ¼ second, whereby said separating wheels tear apart the portions conjoining said block on said separation station and said following block which is held by said conveyor belts, whereby said separating wheels, as block placement means, eject said dud block and said conjoined seedling block together onto said furrow at zero ground speed.

25. The improvement in the transplanter of claim 24, wherein a pair of very small plows are attached to said separation station so that said plows remove thin strips of earth from the bottom of said furrow and immediately rearwardly of the outer sides of said delivery tube and turn said thin strips of earth onto the sides of said seedling block in order to stabilize said seedling block.

26. Using a high speed transplanter comprising a frame which is rotatively supported by wheels, a method for transplanting seedlings grown in grow blocks as a plurality of seedling blocks which contain at least one seedling and of dud blocks which lack a seedling and for replacing each said dud block with a following grow block which is statistically likely to be a seedling block, whereby planting efficiency can be increased by producing a more perfect stand, said method comprising:
A. handling said seedlings as conjoined grow blocks, firstly as components of trays, next as components of sequentially disposed cakes, and thirdly, as components of files after longitudinally cutting said sequentially disposed cakes to form said files;
B. delivering said files rearwardly and downwardly through a plurality of delivery tubes that are attached to said transplanter and curvingly and smoothly diverge and descend to positions in a selected spatial relationship to a plurality of furrows over which said high speed transplanter is traveling;
C. sensing the presence of said seedlings in each said grow block that is passing through each said delivery tube and thereby detecting the absence of a seedling in each said dud block;
D. signaling the presence of each said dud block to a holding-back-and-feeding means for additionally feeding said blocks;
E. advancing at least one additional said grow block when said signaling is received;
F. detaching said at least one additional grow block from the succeeding blocks;
G. moving said at least one additional grow block to said furrow and depositing it therewithin at zero speed in relation thereto; and
H. firming soil about said at least one additional grow block.

27. The method of claim 26, wherein said holding-back-and-feeding means comprises a block separation means for forcibly separating each said seedling block from the following block but not for separating any said dud block from the following block in one of said files of conjoined blocks.

* * * * *

UNITED STATES PATENT AND TRADEMARK OFFICE
CERTIFICATE OF CORRECTION

PATENT NO. : 4,289,080
DATED : Sep. 15, 1981
INVENTOR(S) : Percy A. Penley

It is certified that error appears in the above—identified patent and that said Letters Patent is hereby corrected as shown below:

Column 7, line 33, delete "embodiment" and insert --endmost--.
Column 11, line 57, delete "part" and insert --pair--.
Column 12, line 27, delete "position" and insert --piston--.
Column 13, line 6, delete "pitch" and insert --hitch--.
Column 14, line 19, delete "end" and insert --ends--.
Column 15, line 4, delete "conjoining" and insert --conjoined--; line 24, delete "disc", and insert --discs--; line 46, delete "into" and insert --in--.
Column 16, line 61, insert --delivery-- after "adjacent".

Column 17, line 30, insert --belts-- before "141".
Column 20, line 58, delete "claim 4" and insert --claim 3--.
Column 21, line 36, delete "5/8th" and insert --3/8th--.

Signed and Sealed this

Twenty-sixth Day of January 1982

[SEAL]

Attest:

GERALD J. MOSSINGHOFF

Attesting Officer   Commissioner of Patents and Trademarks